G. M. FISHER & A. E. EMBLETON.
SAFETY CRANKING DEVICE.
APPLICATION FILED JUNE 21, 1910.
986,275.
Patented Mar. 7, 1911.
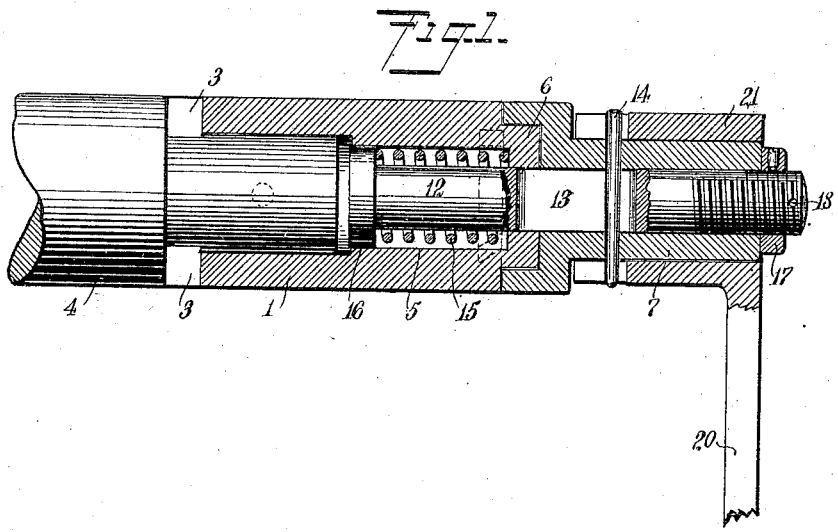
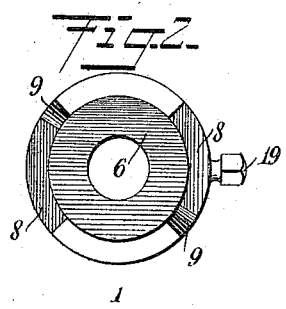
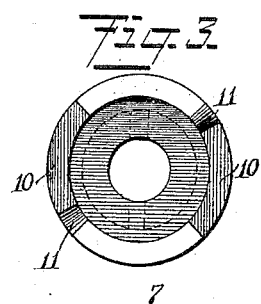
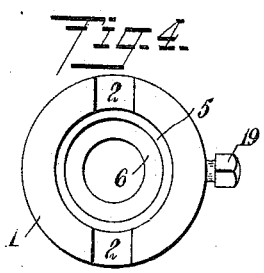
WITNESSES:
INVENTORS
George M. Fisher
Albert E. Embleton
BY
ATTORNEYS

UNITED STATES PATENT OFFICE.

GEORGE M. FISHER, OF EAST ORANGE, NEW JERSEY, AND ALBERT E. EMBLETON, OF PITTSTON, PENNSYLVANIA.

SAFETY CRANKING DEVICE.

986,275.      Specification of Letters Patent.      Patented Mar. 7, 1911.

Application filed June 21, 1910. Serial No. 568,109.

*To all whom it may concern:*

Be it known that we, GEORGE M. FISHER, a resident of East Orange, in the county of Essex and State of New Jersey, and ALBERT E. EMBLETON, a resident of Pittston, in the county of Luzerne and State of Pennsylvania, both citizens of the United States, have invented a new and Improved Safety Cranking Device, of which the following is a full, clear, and exact description.

The invention relates to starting devices, and has for an object to provide a safety cranking device for operating the piston of an engine preparatory to starting the engine. For the purpose mentioned use is made of a sleeve for engagement with the crank shaft of an engine, a second sleeve mounted to loosely fit the first sleeve, cams on the sleeves and adapted to engage, and spring controlled means removably and adjustably securing the said sleeves.

Reference is to be had to the accompanying drawings, constituting a part of this specification, in which similar characters of reference denote corresponding parts in all the views and in which—

Figure 1 is a longitudinal sectional view showing our device applied to the shaft of an engine; Fig. 2 is an end view of one of the sleeves and showing the cams thereon; Fig. 3 is an end view of the other sleeve and showing the cams thereon; and Fig. 4 is an end view of our device with the bolt removed.

Referring to the drawings we employ a sleeve 1 having notches 2 at one end thereof for engagement with a gripping pin 3 of an engine shaft 4. The sleeve 1 has an internal portion 5 of decreased diameter and an outer collar 6 on which is loosely mounted a second sleeve 7. The sleeve 7 is provided at the collar end with cams 8 having inclined surfaces 9, and the sleeve 7 is provided with similar cams 10 having inclined surfaces 11 and adapted to engage the cams 10. A bolt 12 having a longitudinal slot 13 therein, is disposed to pass through the sleeves 1 and 7, and is secured to the sleeve 7 by a pin 14 passing transversely through the sleeve 7 and the slot 13. A spring 15 is disposed on the bolt 12 intermediate the head 16 of the bolt and the collar 6 of the sleeve 1. The end of the bolt 12 is preferably threaded, and a nut 17 is secured thereto and held by a cotter pin passed through a hole 18 in the bolt 12. The spring 15 can be compressed to a greater degree by simply screwing up on the nut 17, as will be easily understood.

For the purpose of securing the shaft 4 to the sleeve 1, a suitable screw 19 is provided on the sleeve 1 and adapted to engage the shaft 4.

In the operation of our device, when it is desired to crank the engine, a handle 20 having a notched collar 21, is slipped over the sleeve 7 so that the handle is rigidly held from turning thereon. Now as the handle is turned in a clockwise direction, the sleeve 7 will turn and the inclined surfaces 11 on the sleeve 7 will contact with the inclined surfaces 9 of the sleeve 1. The spring 15 having been adjusted to withstand a slightly greater pressure than that ordinarily generated on a compression stroke in the engine cylinder, as the handle 20 is turned the sleeve 1, and consequently the shaft 4, will turn with it, thus insuring the operation of the piston of the engine, for a compression stroke. Now, if for any reason, there is an over excess of pressure in the cylinder or a back fire results, the inclined surfaces 9 of the sleeve 1 will slide over the inclined surfaces 11 of the sleeve 10, thus permitting the sleeve 1 to move in a counter direction to the movement of the crank handle 20, without subjecting the handle to a similar backward movement. With the regular cranking handle now generally used directly on the shaft, when a back fire occurs the handle is usually wrenched from the hand and often serious injury to the hand results. With our device, however, when the back fire occurs, the handle can be either held stationary or can be moved in the regular clockwise direction. By having the spring pressure slightly greater than the ordinary pressure in the engine on starting, when no back fire occurs the strength of the spring will be sufficient to turn the sleeve 1 with the sleeve 7 when the handle is operated. After the inclined surfaces 9 and 11 start to contact on a backfire and the sleeve 1 slides on the surfaces 11, the cam surfaces 8 and 10 engage and the sleeve 1 slides over the cams 10 of sleeve 7 and then the inclined surfaces 9 and 11 again contact.

Although for the purpose of illustrating our invention, we have shown a particular construction it will be understood that the scope of the invention is defined in the appended claim.

Having thus described our invention, we claim as new and desire to secure by Letters Patent:

A device of the class described comprising a sleeve provided at one end with notches for engagement with the shaft of an engine, a plurality of cams on the other end of the sleeve, a second sleeve adapted to loosely fit the first sleeve, a plurality of cams on the second sleeve and adapted to engage the cams on the first sleeve, a slotted bolt adapted to adjustably connect the sleeves, a spring for engagement with the bolt, and a turning crank for engagement with the second sleeve for turning the same, a pin disposed through one of the sleeves and adapted to pass through the slot in the bolt to secure the bolt and the sleeve.

In testimony whereof we have signed our names to this specification in the presence of two subscribing witnesses.

GEORGE M. FISHER.
ALBERT E. EMBLETON.

Witnesses to the signature of George M. Fisher:
ANNA T. MCMANUS,
HARRY HILE.

Witnesses to the signature of Albert E. Embleton:
LEWIS SMITH,
JOSEPH EMBLETON.

---

Copies of this patent may be obtained for five cents each, by addressing the "Commissioner of Patents, Washington, D. C."